Figure 1:
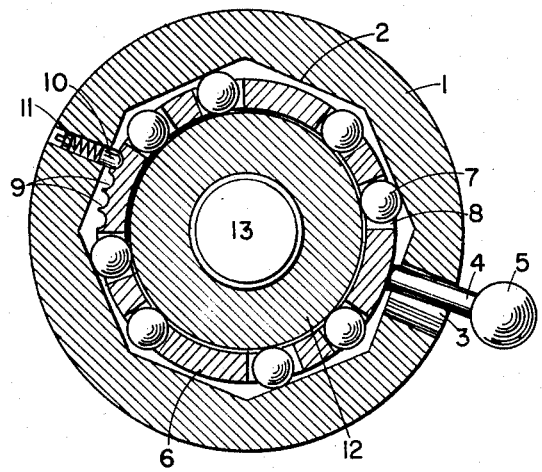

Nov. 18, 1958     C. A. AVANZATI     2,860,750

NOVEL JACK CLUTCH FOR USE IN MACHINE-TOOLS AND TOOLS

Filed Oct. 12, 1954

*INVENTOR.*
Carlos Alberto Avanzati.

BY Maxwell E. Sparrow.
*ATTORNEY.*

United States Patent Office 2,860,750
Patented Nov. 18, 1958

2,860,750

NOVEL JACK CLUTCH FOR USE IN MACHINE-TOOLS AND TOOLS

Carlos Alberto Avanzati, Buenos Aires, Argentina

Application October 12, 1954, Serial No. 461,902

1 Claim. (Cl. 192—44)

The present invention refers to a novel jack for use in connection with machine-tools and tools of any kind, and also in connection with any other means in which it would be required to indistinctly operate in one sense or the other and to provide free motion indistinctly in one sense or the other, a tool or any other means, with angular turning motion relatively of a real or imaginary axis.

Devices of this kind are already known, but every one of them in the knowledge of the applicant, have their alternating motion that applies force on the shaft and the free motion over the same, accomplished by means of a dog directly or indirectly carried by a lever, the dog acting by pushing effect and alternately by sliding action over teeth or toothed wheels that are secured to the core that drives the rotation of the shaft. These devices are used for driving drills in reduced spaces that do not allow for the use of turning handles, in connection with tube wrenches, nut wrenches, free wheels, etc.

All such known devices have the serious drawback, a very prejudicial one in the operation of the tools that use them, that the position of the lever not always can be carried angularly to the exact point that the dog requires for engaging without play that makes useless or scarcely profitable its motion, a drawback that is solved by the present device which, besides, does away with the high cost of parts such as toothed wheels, toothed levers, etc. required in them, and their costly mounting. There is also eliminated every noise with the use of the present device, contrary to what happens with the devices heretofore known.

The present device has particular application for driving the linen washing machines equipped with paddles, in which, when conveniently combined through a special transmission that is the subject matter of a sister patent application, it is used for driving with intermittent motion, the paddles that carry out the washing operation, while for the drying operation at a higher speed, the drive of the motor is exerted directly over the shaft of the basket.

In its essential feature the novel jack consists of an outer body for driving it and receiving the surge from any source such as a motor, lever, or any other. This body has an inner hollow of octagonal shape in which is lodged, with due accuracy or precision, a movable ring carrying four pairs of balls lodged in spaced holes, those of each pair at equal distance and each pair at equal distance one from the other. Within said ring is inserted the core or driven member, also of the exact required diameter and axially provided with a hole for receiving, for example, the shaft to be driven, a mandrel for a drilling tool or any other. The said ring has, for example, four positions relative of the said octagonal hollow, positions that are defined by a stop that is oscillated at will and that defines free rotation (or active rotation) in one sense; or the reversal; engagement without relative motion, and wholly free motion of the parts. In operation, a lever secured to said ring and which may be displaced by stops or otherwise, places the ring with its balls at one side and the other, of the running of the ring, motion that defines the trailing of the core driven in one direction or the other.

In order that the present invention may be readily understood and carried into effect in its fundamental idea, same will be described with full details in the character of an illustrative but not limitative example and with reference to the accompanying drawings which are a part of the specification.

Figure 2:
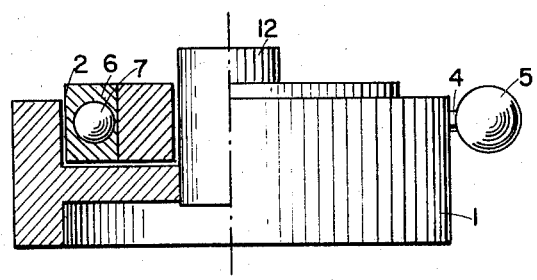

In the drawings:

Fig. 1 shows in elevation a cross section showing the inner arrangement of the device; and Fig. 2 is a half section showing the side thereof.

In both figures of the drawings the same reference signs designate similar or equivalent parts.

The outer body of the jack, indicated as 1, is provided with an octagonal hollow, and its outer surface is intended for being secured to the driving means, for moving it as required.

At one point of its contour it presents an opening 3 through which passes pin 4 having at its free end a button 5, while its inner end is secured to ring 6 carrying the four pairs of balls 7, lodged for free rotation in cavities 8 of ring 6. The balls are arranged in pairs spaced from each other at an equal distance, and the balls of each pair are also arranged equidistant one of the other. The distance between the balls of each pair and between each pair thereof, is operatively related with the length of each side of the octagonal hollow, for the purposes to be seen hereinafter.

Ring 6 has at one point of its periphery a plurality of notches 9 (four in the arrangement described) which, cooperating with stop 10 resiliently controlled by spring 11, can adjust the relative position of body 1, ring 6 and its balls, and the core or driven member 12, provided with an axial opening 13, for the purposes already mentioned.

It may be seen that when the axis of the balls of each pair are parallel to one side of the octagonal hollow, a position that is determined by stop 10 and corresponding notch 9, balls 7 do not exert wedge action of any sort on core 12 driven by body 1, so that they can turn free and independently relatively one of the other.

With the engagement of the corresponding notch with the stop, each of the balls 7 will press against the slanting wall placed in front thereof, and the device will be prevented from moving by the wedge action of the balls against the walls.

In another relative position of the notch and stop, only the balls of one side of each pair will become engaged, so that with the motion of the outer member 1, the core will be driven by 12, being able to rotate free relatively each of the other in the contrary sense or reverse direction; finally, in the last position of the device shown, the sense of the active and free rotation will have been reversed between bodies 1 and 12.

It will be evident that the constructive details described and illustrated in the acocmpanying drawings may be varied without thereby altering the scope of the present invention as more clearly set forth in the claim that is annexed to this specification.

What is claimed is:

A jack for use in machine-tool and tools, comprising an outer member having an inner hollow octagonal in shape, pairs of balls, a ring lodged in said hollow and carrying in respective holes said pairs of balls, said balls being of a diameter larger than the thickness of said ring, a pin projecting outside of said outer member through an opening therein, said pin being provided with gripping means, said ring being connected at one point of its periphery with one end of said pin, a spring-urged stop traversing the wall of said outer member, said ring being provided at another point of its periphery with a plurality of notches arranged in line with said stop, a core having an axial drill and being arranged to contact said balls, said balls being arranged in four pairs, each pair being equidistantly spaced from the other and the balls of each pair being equidistantly spaced one from the other, driving means connected to said outer member, and driven means connected to said core.

References Cited in the file of this patent

UNITED STATES PATENTS

| | | |
|---|---|---|
| 831,856 | Hackley | Sept. 25, 1906 |
| 2,139,650 | Anderson et al. | Dec. 13, 1938 |
| 2,408,335 | Oliver et al. | Sept. 24, 1946 |
| 2,584,256 | Brown | Apr. 6, 1949 |

FOREIGN PATENTS

| | | |
|---|---|---|
| 509,594 | Great Britain | July 14, 1939 |